United States Patent Office 3,085,429
Patented Apr. 16, 1963

3,085,429
VISUAL INDICATING DEVICES FOR USE
IN AIRCRAFT
Alastair Michael Adair Majendie, Cookham Dean, England, assignor, by mesne assignments, to S. Smith & Sons (England) Ltd., London, England, a corporation of England
Filed Oct. 31, 1960, Ser. No. 66,203
Claims priority, application Great Britain Jan. 20, 1960
29 Claims. (Cl. 73—178)

The present invention relates to visual indicating devices for use in aircraft and is concerned in particular with such devices which are improvements in or modifications of those described and claimed in the specification filed in respect of United States patent application Serial No. 758,970. The invention is also concerned with aircraft control cabins which are improvements in or modifications of those described and claimed in the said complete specification.

The invention is concerned in particular with the arrangement of these visual indicating devices in an aircraft control cabin for the purpose of imparting additional visual information to a pilot whilst he is maintaining a continuous watch out of the aircraft through a windscreen provided for that purpose, or in some instances whilst he is engaged in looking at other devices within the control cabin. Whilst this information may relate to any chosen quantities, the case in which the information relates to the control of the aircraft in pitch and in bank is a particularly important and useful one. The invention is also concerned with the form of the indicating devices.

According to the present invention an aircraft control cabin in which there is a windscreen through which a pilot looks forwards from the aircraft in operation, is provided with a first visual indicating device capable of providing a moving optical stimulus in the form of one or more light sources which may be made to move or appear to move along a line approximately parallel to said general direction, the line lying within the periphery of the pilot's field of view and to one side of his line of sight when looking in said general direction, a second visual indicating device capable of providing a moving optical stimulus in the form of one or more light sources which may be made to move or to appear to move along a line lying transversely of said general direction, the line lying within the top or the bottom of the periphery of the pilot's field of view when looking in said general direction, means for actuating the first visual indicating device to provide a moving optical stimulus the rate and direction of which are indicative of the magnitude and sense of any departure of a first quantity from a desired value and means for actuating the second visual indicating device to provide a moving optical stimulus, the rate and direction of which are indicative of the magnitude and sense of any departure of a second quantity from a desired value. The general direction will usually be forwards from the aircraft and substantially parallel to its fore-and-aft axis.

Preferaby, the first visual indicating device is duplicated, the duplicate visual indicating devices lying one on either side of the pilot's line of vision when looking in said general direction. The second visual indicating device may also be duplicated if required, the duplicate visual indicating devices lying one at the top and one at the bottom of the periphery of the pilot's field of view when looking in said general direction. The visual indicating devices will usually be arranged so that the lines of movement are horizontal when the aircraft is in level flight. It will be appreciated, however, that they may lie only approximately horizontal, for example at angles of 5° to the horizontal or more, and that in addition they may be slightly curved. Further, the first indicating device or devices need not be arranged so that the lines of movement are exactly parallel to said general direction. They may be only approximately parallel to it, for example at angles up to about 20°, and where there are two, they may, for example converge away from the pilot at an angle to one another, for example an angle of 20°–40°.

Where the second visual indicating device (or one of them if it is duplicated) lies at the bottom of the pilot's field of view when looking in said general direction, it will usually be arranged across the top of his instrument panel. The first visual indicating device or devices may also be at or near the same level and it is then possible for the indicating devices to serve their intended purpose whilst the pilot is observing instruments on the panel, as they will still lie within the periphery of his field of view.

One particularly important case is that in which the first and second quantities are or are related to the aircraft's pitch and bank attitudes respectively. In particular, the visual indicating devices may be actuated in dependence upon the magnitudes and senses of pitch and bank error signals which are derived respectively from the differences between demanded and actual pitch attitude signals and demanded and atual bank attitude signals. In these cases, the demanded pitch or bank attitude signals represent respectively the desired value of pitch or bank attitude. The demanded attitude signals may simply represent demands for a fixed datum attitude, commonly that for straight and level flight, but they may be more complex and depend on two or more related variables. For example, a pitch demand signal may be a combination of a first signal demanding on its own a level pitch attitude and a second signal which demands the pitch attitude to be varied so that the aircraft climbs or descends to reach a predetermined height and then levels out to maintain that height. The first signal would be a constant signal and the latter a signal which would initially take some suitable value if the aircraft is not at the predetermined height and then decrease gradually to zero as the aircraft's height approaches the predetermined value owing to the change in the aircraft's pitch attitude brought about by the signal. Once the predetermined height is reached, the second signal will vary only by small amounts on either side of zero if there is any tendency for the aircraft's height to change. At the same time, the pitch attitude will be maintained level as determined by the constant value of the first signal.

In another example, the bank demand signal may be a combination of a heading error signal derived from a compass and a signal representing the lateral deviation of the aircraft from the centre of a radio-defined beam. If the datum heading set in the compass is that of the beam direction and we start with the aircraft on the correct heading but displaced from the beam centre, the first signal would be zero and the second at some value according to the displacement. This would cause the aircraft to be banked to turn in such a way as to decrease the lateral displacement and hence the second signal. Meanwhile, the first signal would increase in the opposite sense as the heading deviated from the datum and would eventually outweigh the second signal and cause the aircraft to be banked in the opposite direction so as to turn to bring it back towards the correct heading. The lateral displacement would still be decreasing, however, and eventually the aircraft will have been brought on to the correct heading with no displacement from the beam.

Preferably, in such cases, where the first and second quantities are or are related to the aircraft's pitch and bank attitudes, the first visual indicating device or devices is or are actuated so that the direction of movement of the optical stimulus is forwards when the pitch attitude differs from a desired one in such a manner that the aircraft's nose needs to be depressed (i.e. the angle of dive increased or the angle of climb decreased) and backwards when a manoeuvre in the opposite sense is required. Preferably, also, the second visual indicating device or devices is or are actuated so that the direction of movement of the moving optical stimulus is to the left or to the right according as to whether the bank attitude differs from a desired one in such a manner that the aircraft needs to be banked towards the left or towards the right respectively. The opposite senses of movement may also be used but have been found in general to be less effective in operation.

According to a feature of the present invention, apparatus for use in an aircraft control cabin according to the present invention, comprises at least two visual indicating devices, each of which comprises a cylindrical member mounted for rotation about its longitudinal axis and means for illuminating a continuous helical area of at least two complete turns on the surface of the member, the member being mounted in an enclosure provided with a slot exposing a longitudinal strip of the surface of the member, actuating means for each device which means includes a motor coupled to the device to cause rotation of the member about its longitudinal axis in either sense and separate means for energising each motor to drive the member at a velocity and in a sense dependent on the magnitude and sense of an input signal, and means for generating and applying to each said actuating means a signal dependent on the magnitude and sense of the variation of a variable quantity from a desired value.

Preferably the helical area consists of between four and ten complete turns. The cylindrical member may have interlaced black and white helices on its surface and be illuminated generally so that the white helix appears as an illuminated helical area.

An example of an aircraft control cabin and apparatus for use therein according to the present invention will now be described with reference to the accompanying drawings in which.

Figure 1:
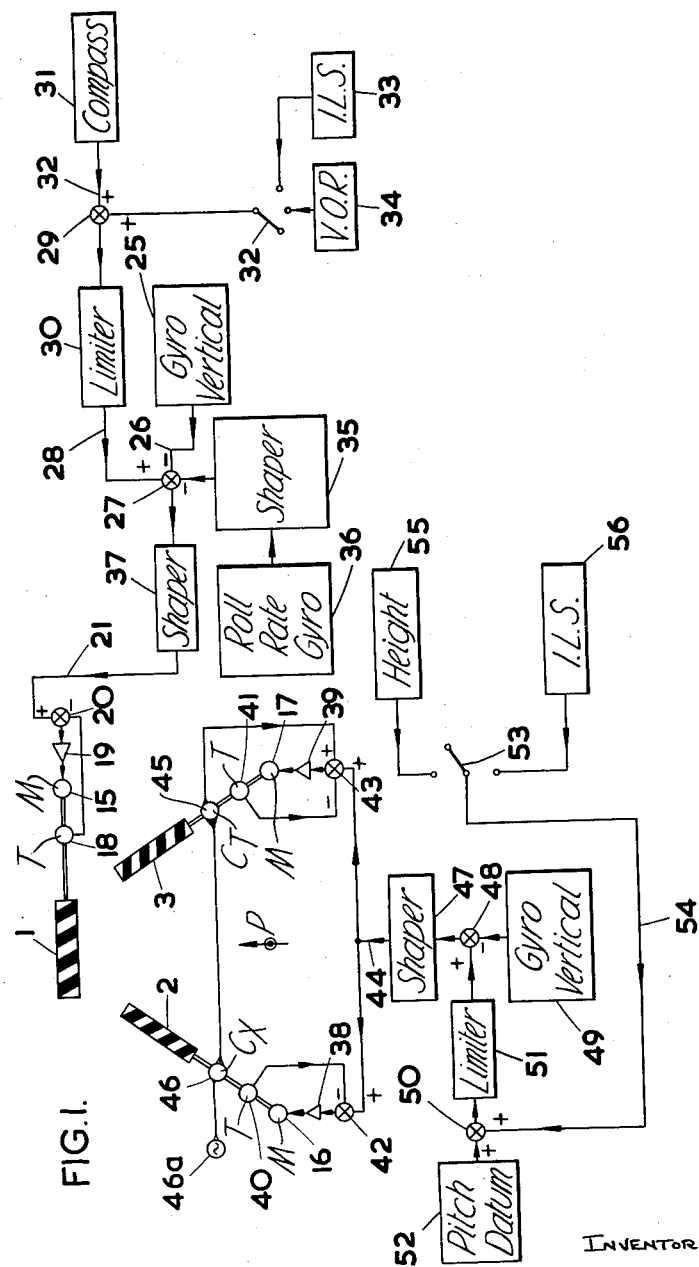
FIGURE 1 shows a block schematic diagram of the apparatus.

The apparatus to be described and of which a block diagram is shown in FIGURE 1, includes three visual indicating devices 1–3 which are shown diagrammatically in FIGURE 1 approximately as they appear in plan view when arranged in an aircraft cockpit to provide indications to a pilot positioned in the region of the point P. When looking ahead out of the aircraft, the pilot would look in the direction of the arrow shown in FIGURE 1 passing through the point P. The devices 1–3 lie horizontally and their vertical level is approximately that of the top of the instrument panel (bottom of the windscreen) so that they lie in the bottom of the pilot's field of view when he is looking ahead out of the windscreen, the device 1 lying transversely of the direction in which he is looking and the devices 2 and 3 approximately parallel to that direction.

The indicating devices 1–3 are represented only diagrammatically in FIGURE 1, each consisting of a cylindrical member which may conveniently be between four and twelve inches in length and about three quarters of an inch in diameter. The member had interlaced black and white helices painted on its surface, the resultant black and white bands being half an inch wide. The members are mounted for rotation about their longitudinal axes and each is contained within a case having a slot which allows a longitudinal strip of the surface of the member to be viewed from without. The width of the strip is about half the diameter of the members. The surfaces of the members are illuminated from within the cases and on rotation of a member the apparent effect to a person viewing through the slot is of a number of illuminated areas moving in one direction or the other along the length of the slot. The apparent direction of motion depends on the direction of the rotation of the member and the speed is proportional to the speed of rotation.

Figure 2:
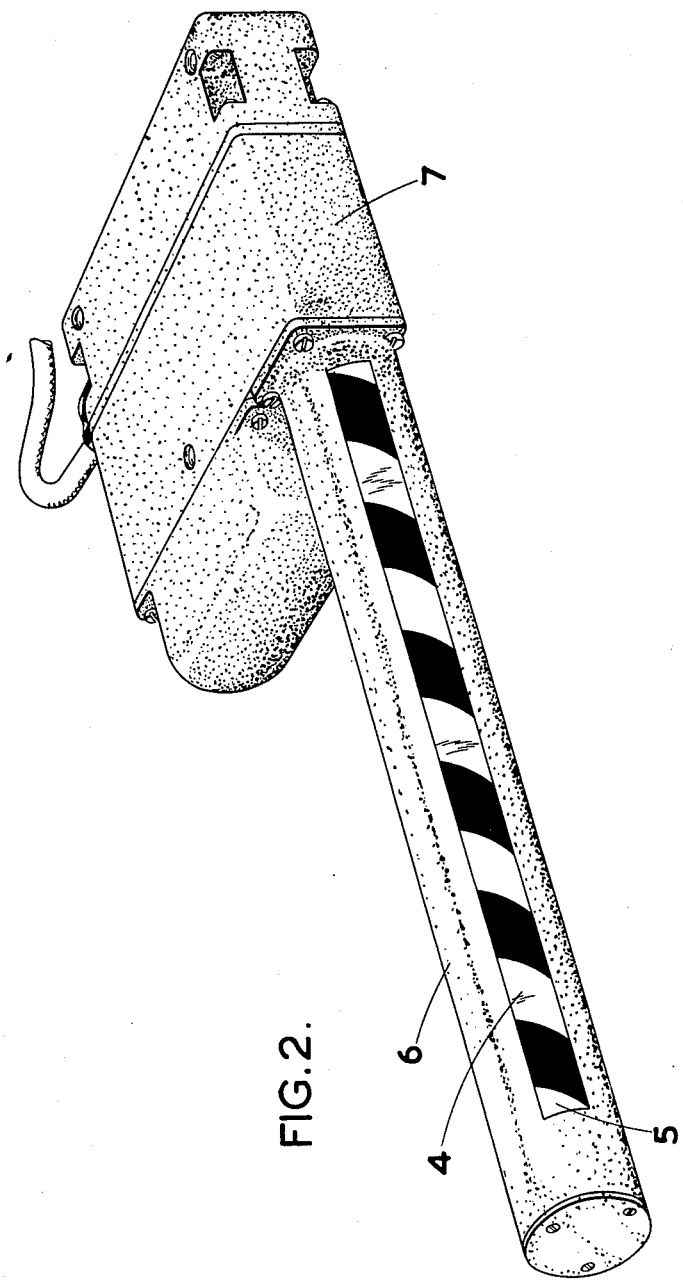
FIGURE 2 shows a view of one indicating device.

FIGURE 2 of the drawings shows a perspective view of one of the devices, showing part of the surfaces of the cylindrical member 4 visible through a longitudinal slot 5 in the cylindrical case 6 within which the member 4 is mounted. The case 6 is supported from a further casing 7 which contains an electric motor for driving the member 4 and other associated equipment which will be described in more detail below.

Figure 3:
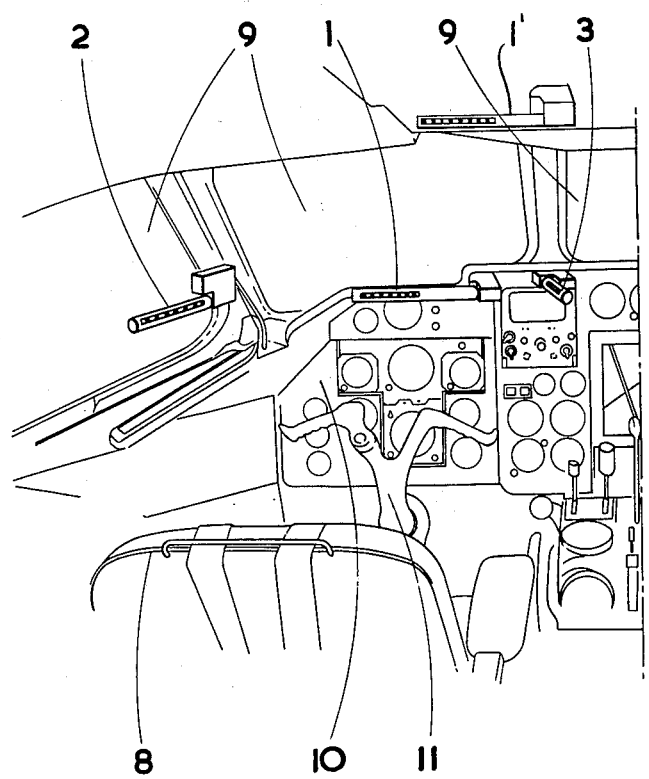
FIGURE 3 shows a view of part of the cabin with three indicating devices mounted in position.

FIGURE 3 of the drawings shows a view from behind the pilot's seat of one side of the front of an aircraft cockpit, there being shown the pilot's seat 8, the three indicating devices 1–3, parts of the windscreen 9 and of the instrument panel 10, and the control column 11. Where, as is usual in large transport aircraft, a co-pilot's seat and control column is provided, the devices 1–3 may be duplicated and the duplicate set being similarly arranged with respect to the co-pilot's seat and the part of the windscreen 9 through which he normally looks.

Turning back to FIGURE 1, it will be seen that the cylindrical member of each device 1–3 is shown coupled to the output shaft of an electric motor 15, 16 or 17. These motors 15–17 are mounted in the casings 7 (FIGURE 2), together with certain associated apparatus used to assist in the control of the motors. In the case of the device 1, this associated control apparatus includes a tachometer generator 18 driven by the output shaft of the motor 15 to generate a voltage proportional to the speed of the motor 15, a servo amplifier 19 for controlling the operation of the motor 15, which amplifier may be of any desired form, for example a thermionic valve or magnetic amplifier, and a signal combining device 20 having two signal inputs and a single output which is coupled to the input of the amplifier 19. One of the inputs of the device 20 is coupled to the output of the tachometer generator 19 and the other to an input line 21. As indicated by the plus and minus signs against the appropriate input leads to the device 20, the signals fed to it are in such senses as to subtract from one another to provide a difference signal for application to the amplifier 19. This sign convention is used throughout FIGURE 1 in respect of the several signal combining devices included in it.

By thus feeding back the output of the tachometer generator 18 to the input of the amplifier 19 in opposition to the signals on the line 21, the servo-control system for the device 1 constituted by the elements 15 and 18–20 operates to drive the device 1 at a speed proportional to the magnitude of the input signal appearing on the line 21.

The input signal on the line 21 is a bank error signal which is obtained by comparing signals representing the aircraft's bank attitude and signals representing a demanded bank angle, the difference being used to generate a signal for application to the line 21. As a result the speed of rotation of the cylindrical member in the device 1 will depend on this bank error signal and its sense on the direction of the bank error. For reasons which will be explained, the sensing is made such that the areas of light seen through the slot 5 (FIGURE 2) move to the left or the right according as to whether the pilot is required to move the control column to the left or the right respectively to correct the error giving rise to the signal concerned.

The bank error signal may be generated in any desired manner and from a variety of signal sources as is well known. An example of apparatus for this purpose is shown in FIGURE 1 as a block circuit diagram, this apparatus together with the similar apparatus described below for generating pitch error signals, constituting one or more units separate from the indicating devices shown in FIGURE 2, and coupled to them by external leads. As shown, the apparatus includes a conventional gyro-vertical 25 having a pick-off providing an electrical signal on line 26 representing the aircraft's angle of bank. This is applied to one input of a signal combining device 27. A bank demand signal is applied to a second input of the device 27 over the line 28 in the opposite sense to the bank angle signal. This demand signal is derived from the output of a further signal combining device 29, the output of which is coupled to the line 28 through a conventional limiting circuit 30, provided to prevent the bank demand signal exceeding a predetermined safe limit.

The device 29 has two inputs, one coupled to a compass system 31 in the aircraft, for example a directional gyroscope monitored by a magnetic reference device, arranged in known manner to provide a signal on the line 32 representing the deviation of the aircraft's heading from a desired course and the other coupled to a three position switch 32. By means of the switch 32, the other input of the device 29 can be left disconnected or can be coupled to an output of either an I.L.S. (instrument landing system) localiser receiver 33 or a V.O.R. (V.H.F. omni-range) receiver 34. The signals from these outputs of the receivers 33 and 34 are those which represent the lateral displacement of the aircraft from a selected radio beam. It will be appreciated that other forms of radio apparatus may be arranged for selection by the switch 32 if desired and that the two shown are simply commonly used examples. The signals applied to the two inputs of the device 29 are sensed additively so as to provide a combined bank demand signal, for example representing the aircraft's deviation from the course of a selected radio beam and its lateral displacement from the centre of that beam. Alternatively, any other means of computing bank demand, which may or may not include compass information, may be used.

The third input to the device 27 is coupled through a signal shaping circuit 35 to an output from a rate gyro 36 arranged to generate a signal representing the aircraft's roll rate, the signal being applied to the device 27 so as to subtract from the bank demand signal on the line 28. The shaper 35 has a characteristic determined in known manner so that the output signal from the gyro 36 is applied to the device 27 only if the aircraft's rate of roll exceeds a predetermined value. This value is set so that for all ordinary manoeuvres no roll rate signal is applied to the device 27, but so that, if a large bank demand signal occurs, the roll rate signal resulting from the consequent application of a large bank angle acts to oppose the bank demand signal and effectively prevents the pilot from over-banking, a fault which otherwise tends to occur if a rapid movement suddenly appears on the device 1 due to a sudden demand for a large change of course. This may or may not be necessary according to the characteristics of the aircraft in which the apparatus is fitted.

The output from the device 27 is finally passed through a further shaping circuit 37 to the input line 21 of the control system for the device 1. The output of the device 27, ignoring the occasional effect of the signals from the roll rate gyro 36, is a true bank error signal representing the difference between the aircraft's bank angle and a demanded angle of bank. The shaper 37 has a characteristic such that the signals passed through it are relatively attenuated if they are of small amplitude, this provision being made to reduce the sensitivity of the device 1 to small error signals which may arise due to turbulence or similar factors.

The apparatus provided for actuating the two devices 2 and 3 is similar to that for the device 1. It is arranged so that the cylindrical members are rotated together at a speed representing a pitch error signal, the sensing being such that the areas of illumination seen through the slots 5 appear to move forward or backwards according to whether the pilot needs to move the control column forwards or backwards respectively to correct the pitch error giving rise to the indication. Each motor 16 and 17 is energised by an amplifier 38 or 39 and drives a tachometer generator 40 or 41 in addition to the cylindrical member of the device 2 or 3. The inputs of the amplifiers 38 and 39 are coupled to the outputs of signal combining devices 42 and 43 respectively. In the case of the device 42, there are two inputs, one coupled to the output of the tachometer generator 40 and the other to the common input line 44 of the two servo-control systems (16, 38, 40 and 42) and (17, 39, 41 and 43) for the devices 2 and 3. The device 43, however, has a third input which is coupled to the rotor of a synchro-transformer 45 which rotor is driven by the output shaft of the motor 17. The stator of the transformer 45 is coupled to the stator of a synchro-transmitter 46, the rotor of which is energised by a suitable alternating current voltage 46a and is driven by the output shaft of the motor 16. The signal applied to the device 43 from the transformer 45 will be an alternating current voltage (this may be converted to some other form of signal if required, for example to a D.C. signal by a demodulator) representing the difference of the positions of the output shafts of the motors 16 and 17. By feeding this signal back to the input of the amplifier 39 through the device 43, the rotation of the members in the devices 2 and 3 is controlled to be exactly equal.

The signal applied to the common input line 44 is a pitch error signal after passage through a shaping circuit 47, similar to the shaper 37 in the bank circuits, the pitch error signal being obtained from the output of a signal combining device 48. One input of the device 48 is coupled to a pitch signal pick-off in a gyro vertical 49 (this may be the same apparatus as the gyro vertical 35, the one gyro vertical being provided with both pitch and bank pick-offs in known manner), providing signals representing the aircraft's actual pitch attitude. This is opposed by a pitch demand signal derived from the output of a further signal combining device 50 through a limiter circuit 51, provided to prevent the application of pitch demand signals greater than a predetermined safe limit.

The device 50 has two inputs, the signals applied to which are combined additively, one coupled to the output of a datum pitch attitude setting device 52 and the other coupled to a three position switch 53 by a line 54. The switch 53 can be operated to leave the line 54 disconnected, or to connect it to a height error signal generator 55, or the output of an I.L.S. receiver 56 representing the deviation in the vertical plane of the aircraft from a predetermined glidepath. The generator 55 may for example include in known manner a barometric pressure capsule and means for generating from the movements of the capsule an electric signal representing the aircraft's deviation from a datum height which can be set by the pilot. It will be appreciated that the receiver 56 will usually be part of the same I.L.S. equipment as the receiver 33, the one equipment operating to provide the two required output signals from the radio signals received by it from an I.L.S. localiser and glidepath transmitters and also that the switches 32 and 53 may be ganged or interlocked in some way to arrange that the two I.L.S. signals are utilised together and that such other combinations of positions of the two switches as are permissible provide sensible combinations of inputs to the respective signal channels.

Here, again, it will be seen that various other sources of signals may be included, if desired, for use in generating the pitch error signals in such a form as to give various modes of operation. For example, there may be provided sources of signals representing departure of the indicated airspeed or the mach number from datum values, these quantities then being controlled to the datum by variation of the aircraft's pitch attitude in accordance with the indications of the devices 2 and 3, or sources of signals generated to give indications of the manoeuvres necessary to control the aircraft's pitch attitude to give a selected rate of descent or climb, or to indicate the pitch manoeuvers necessary to control the aircraft in accordance with I.L.S. or radio-altimeter signals to carry out the flare phase of a landing according to a predetermined programme. Alternatively the pitch error signal may be computed from glidepath deviation signals alone.

By arranging the devices 1–3 in the positions shown in FIGURE 3, the moving optical stimuli produced by them in response to pitch and bank error signals lie within the periphery of the field of view of the pilot when he is looking ahead through the windscreen 9. It has been found, as described in my co-pending United States patent application Serial No. 758,970, that it is possible for the pilot to maintain unimpaired his normal fixated view forwards through the windscreen and yet to take full account of the indications of the devices 1–3, the moving stimuli acting, it is thought, on the extra-foveal regions of the eyes. The same applies if the pilot uses his fixated vision to observe the instrument panel 10 and also if he looks in any other direction in the cabin such that the device 1 and one or both of the devices 2 and 3 lie in or towards the periphery of his field of view. Thus if the pilot elects to make a landing in bad visibility conditions by flying down an I.L.S. beam under the control of signals derived from the I.L.S. receiver or receivers 33 and 56 until the flare path lights are visible, he can maintain a continuous watch forward through the windscreen whilst taking full account of the I.L.S. signals by following the indications of the devices 1–3. The awkward transition from instrument to visual flying which is otherwise required, is therefore avoided as the pilot can maintain a constant watch for the aerodrome or its associated visual approach aids and can start to derive information from these when they come into view whilst still complying with the instrumental demands, and can select at will the time to transfer control of the aircraft path from the instrumental demands to visual flying without any awkward hiatus.

It is not of course essential that the exact arrangement of the devices 1–3 shown in FIGURE 3 should always be followed and it will be appreciated in particular that the arrangement may be altered to suit the layout of a particular cockpit. Assuming the main requirement is for the pilot to be able to watch ahead whilst making use of the indications, the device 1 may be positioned above his forward line of sight through the windscreen, for example as indicated at 1' in FIGURE 3, or an additional bank error actuated device may be provided in that position. The position across the top of the instrument panel is preferred, however, as it enables the devices 1–3 to be utilized whilst observing the panel. The devices 2 and 3 may be positioned as required on either side of the pilot's line of view, and preferably at about the same level as the device 1. One of the devices 2 and 3 could be omitted but it is found that in practice a symmetrical display is preferable. They need not be parallel to the pilot's forward line of sight and indeed may converge away from him at angles of as much as 30°–40°. Again the devices 1–3 need not be exactly horizontal, although the divergence should not be more than a few degrees.

By positioning the devices 1–3 horizontally, or approximately so, the advantage is obtained that disturbance of the pilot's vision due to turbulence, this being mainly in the vertical direction, will not give rise to false indications from the devices 1–3, the apparent movements of which are horizontal or nearly so.

As mentioned previously, the sensing of the movements in the device 1 is preferably made such that the direction of movement, to left or right, corresponds to the direction of movement of the control column required to correct the error giving rise to the movement. Similarly in the case of the devices 2 and 3, it is made such that the movement is forwards or backwards according as to whether the control column needs to be moved forwards or backwards. This sensing may not at first sight appear to be the most appropriate, the opposite seeming on paper to be more logical (e.g. a left movement of the column to correct a right movement in the device 1), but it has been found that the sensing described is preferable in operation, the control column movements required in response to given indications seeming instinctively correct to the majority of pilots. The opposite sensing may of course be employed, if required, but the one described is preferred.

The interiors of the cases 6 (FIGURE 2) are provided with lights capable of illuminating the parts of the surfaces of the cylindrical members visible through the slots 5. These lights are preferably provided with a brightness adjustment, for example a variable resistance connected in series with the lamps across the leads for connecting them to a voltage supply source, to enable the pilot to adjust the brightness of the indications according to the light conditions in the cockpit, for example to enable him to dim them to a suitable level at night. In addition, the slots 5 may be provided with spring loaded shutters arranged to be normally closed by the spring loading and provided with an electromagnetically operated mechanism to open them only on energization of the devices. The control circuit for this latter mechanism may include various relay contacts controlled by relays which are operated to open the contacts, thus allowing the shutters to close, should various fault conditions arise in the apparatus associated with the devices. Such fault conditions may for example include failure of power supplies or failure of a radio receiver output when it is being employed as a signal source for operation of one or more of the indicating devices.

In an aircraft that is fitted with an autopilot, the indicating devices 1–3 can be used to operate as an autopilot monitor, if they are operated from signals derived from similar sources to those being used to supply signals to the autopilot. If the indicating devices are operated from an independent set of signal sources which are identical to and switched in accordance with the switching of the signal sources provided for the autopilot, the indicating devices will operate whilst the autopilot is in operation to indicate whether the autopilot is in fact correctly carrying out its intended functions as any error on the part of the autopilot will show as corresponding movements in the indicating devices. These movements, besides acting as a warning, also indicate the action required to correct the autopilot error. This will hold whether the error arises in the autopilot itself or the signal sources associated with it, since the indicating devices are operated from an independent set of signal sources. Should the devices be coupled to the same signal sources as the autopilot, the device will operate as a monitor only of the autopilot servo-amplifier channels and would itself give erroneous indications if for example a fault arose in a gyro vertical apparatus supplying signals to both. However, this limiting monitoring function can also be useful, particularly as a warning of runway faults in the servo channels of the autopilot and a simultaneous indication of the control action needed to correct the result of the fault.

Another possibility which arises here is that the shutters of the devices 1–3 should be kept closed as long as the autopilot is functioning correctly, in those installations where independent monitoring arrangements are provided, so that any movements occurring in the devices due to a fault would not distract the pilot or mislead him into thinking that the autopilot had mal-functioned. The control circuits for the shutters can then be combined with or actuated from the fault warning circuits provided in the monitoring arrangements so that the shutters open immediately a fault arises in the autopilot. In such a case the shutters are preferably arranged so that, when they are closed, there is a small opening left through which direct observation of the moving members within can be made, to enable the pilot to check the correct working of the system and to control the brightness of the illumination.

One particular form of indicating device has been described with reference to FIGURES 1-3 but it will be appreciated that other forms of device for providing a moving optical stimulus, both the rate and direction of which can be varied, may be substituted for them. These other forms include those which represent only a minor variation in that the method of obtaining a helical area of illumination in or on the surface of a cylindrical member is changed. Thus, instead of painting or otherwise marking black and white or, if required, other coloured helices on the surfaces of the members, the latter may be hollow and opaque and be illuminated from within, a helical slot being cut in the surface of each member. Again the member may be transparent and be illuminated from within, having opaque helices on their external surfaces. Yet again the member may have helical areas which can be excited to luminescence or electro-luminescence.

More radical changes are also possible, although the described devices are at present preferred from the point of view of simplicity and robustness. Thus, as described in the specification of United States patent application Serial No. 758,970 with reference to FIGURES 1, 2 and 4-7, each device may be a row of light sources which are sequentially energised or are all energised, the row being moved longitudinally in the required manner in the latter case.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:

1. An aircraft control cabin in which there is a windscreen through which a pilot looks in a general direction forwards from the aircraft in operation, and which is provided with a first visual indicating device capable of providing a moving optical stimulus in the form of at least one light source which may be made to move along a line approximately parallel to said general direction, the line lying within the periphery of the pilot's field of view and to one side of his line of sight when looking in said general direction, a second visual indicating device capable of providing a moving optical stimulus in the form of at least one light source which may be made to move along a line lying transversely of said general direction, the line lying within the bottom of the periphery of the pilot's field of view when looking in said general direction, means for actuating the first visual indicating device to provide a moving optical stimulus the rate and direction of movement of which are indicative of the magnitude and sense of any difference between the aircraft's actual pitch attitude and a demanded pitch attitude and means for actuating the second visual indicating device to provide a moving optical stimulus the rate and direction of movement of which are indicative of the magnitude and sense of any difference between the aircraft's actual bank attitude and a demanded bank attitude.

2. An aircraft control cabin according to claim 1 which further includes an instrument panel at least part of which lies below the windscreen and in which the second visual indicating device lies across the top of the instrument panel whereby it lies in the top of the pilot's field of view when looking at said panel.

3. An aircraft control cabin according to claim 1 in which the visual indicating devices are mounted with the lines of movement disposed horizontally when the aircraft is in level flight.

4. An aircraft control cabin according to claim 1 in which the actuating means for the first visual indicating device operates to provide a direction of movement which is forwards when the aircraft's actual pitch attitude needs to be altered in the sense to bring the aircraft's nose downwards to become equal to the demanded pitch attitude and the actuating means for the second visual indicating device operates to provide a direction of movement which is the same as the direction in which the aircraft needs to be banked in order to make the actual bank attitude equal to the demanded bank attitude.

5. An aircraft control cabin according to claim 1 in which each indicating device comprises a cylindrical member, means for radiating light from a continuous helical area on the surface of said member having at least two complete turns and an enclosure for said member having a slot exposing a longitudinal strip of the surface of said member so as to be visible to the pilot.

6. An aircraft control cabin in which there is a windscreen through which a pilot looks in a general direction forwards from the aircraft in operation, and which is provided with a pair of first visual indicating devices each capable of providing a moving optical stimulus in the form of at least one light source which may be made to move along a line approximately parallel to said general direction, the lines lying within the periphery of the pilot's field of view and one on each side of his line of sight when looking in said general direction, a second visual indicating device capable of providing a moving optical stimulus in the form of at least one light source which may be made to move along a line lying transversely of said general direction, the line lying within the bottom of the periphery of the pilot's field of view when looking in said general direction, means for actuating the first visual indicating devices together to provide a moving optical stimulus the rate and direction of movement of which are indicative of the magnitude and sense of any difference between the aircraft's actual pitch attitude and a demanded pitch attitude and means for actuating the second visual indicating device to provide a moving optical stimulus the rate and direction of movement of which are indicative of the magnitude and sense of any difference between the aircraft's actual bank attitude and a demanded bank attitude.

7. An aircraft control cabin according to claim 6 in which the lines of movement in the two first visual indicating devices converge away from the pilot.

8. An aircraft control cabin according to claim 6 in which the actuating means for the two first visual indicating devices are synchronised so that the moving optical stimuli produced by those devices are identical.

9. An aircraft control cabin according to claim 6 which further includes an instrument panel at least part of which lies below the windscreen and in which the second visual indicating device lies across the top of the instrument panel whereby it lies in the top of the pilot's field of view when looking at said panel.

10. An aircraft control cabin according to claim 6 in which the visual indicating devices are mounted with the lines of movement disposed horizontally when the aircraft is in level flight.

11. An aircraft control cabin according to claim 6 in which each indicating device comprises a cylindrical member, means for radiating light from a continuous helical area on the surface of said member having at least two complete turns and an enclosure for said member having a slot exposing a longitudinal strip of the surface of said member so as to be visible to the pilot.

12. An aircraft control cabin in which there is a windscreen through which a pilot looks in a general direction forwards from the aircraft in operation, and which is provided with a pair of first visual indicating devices each capable of providing a moving optical stimulus in the form of at least one light source which may be made to move along a line approximately parallel to said general direction, the lines lying within the periphery of the pilot's field of view and one on each side of his line of sight when looking in said general direction, a pair of second visual indicating devices each capable of providing a moving optical stimulus in the form of at least one light source which may be made to move along a line lying transversely of said general direction, the lines lying within the bottom and the top respectively of the periphery of the pilot's field of view when looking in said general direction, means for actuating the first visual indicating devices to provide a moving optical stimulus the rate and direction of movement of which are indicative of the magnitude and sense of any difference between the aircraft's actual pitch attitude and a demanded pitch attitude and means for actuating the second visual indicating devices to provide a moving optical stimulus the rate and direction of movement of which are indicative of the magnitude and sense of any difference between the aircraft's actual bank attitude and a demanded bank attitude.

13. An aircraft control cabin according to claim 12 in which the lines of movement in the two first visual indicating devices converge away from the pilot.

14. An aircraft control cabin according to claim 12 in which the actuating means for the two first visual indicating devices are synchronised so that the moving optical stimulus produced by said first indicating devices are identical and the actuating means for the two second visual indicating devices are synchronised so that the moving optical stimulus produced by said second visual indicating devices are identical.

15. An aircraft control cabin according to claim 12 which further includes an instrument panel at least part of which lies below the windscreen and in which the lower one of the second visual indicating devices lies across the top of the instrument panel whereby it lies in the top of the pilot's field of view when looking at said panel.

16. An aircraft control cabin according to claim 12 in which the visual indicating devices are mounted with the lines of movement disposed horizontally when the aircraft is in level flight.

17. An aircraft control cabin according to claim 12 in which each indicating device comprises a cylindrical member, means for radiating light from a continuous helical area on the surface of said member having at least two complete turns and an enclosure for said member having a slot exposing a longitudinal strip of the surface of said member so as to be visible to the pilot.

18. An aircraft control cabin in which there is a windscreen through which a pilot looks in a general direction forwards from the aircraft in operation and which is provided with a pair of first visual indicating devices and a second visual indicating device, each device comprising a cylindrical member mounted for rotation about its longitudinal axis, means for radiating light from a continuous helical area of at least two complete turns on the surface of the member, a variable speed motor coupled to the cylindrical member to cause rotation thereof about said axis and an enclosure for said member provided with a slot through which a longitudinal strip of the surface of said member is visible, the first indicating devices being mounted one on either side of the pilot's line of sight when looking in said general direction through the windscreen and in the periphery of his field of view with the longitudinal axes of the cylindrical members substantially horizontal and at least approximately parallel to said general direction and the slots of the enclosures directed inwards towards said line of sight and the second indicating device being mounted below the pilot's line of sight when looking in said general direction through the windscreen and in the periphery of his field of view with the longitudinal axis of the cylindrical member lying substantially horizontal and transversely of said line of sight and the slot of the enclosure directed towards the pilot, means for actuating the first visual indicating devices to cause the motors to rotate the cylindrical members in opposite senses (as viewed by the pilot) at a speed and in directions such that the apparent motion of the visible parts of said helical areas is of a magnitude and in a direction representing any difference between the aircraft's actual pitch attitude and a demanded pitch attitude and means for actuating the second visual indicating device to cause the motor to rotate the cylindrical member at a speed and in a direction such that the apparent motion of the visible parts of said helical area is of a magnitude and in a direction representing any difference between the aircraft's actual bank attitude and a demanded bank attitude.

19. An aircraft control cabin according to claim 18 in which each cylindrical member has interlaced black and white helices on its surface and the indicating devices further include means mounted within the enclosure for illuminating the surface of the cylindrical member.

20. An aircraft control cabin according to claim 18 in which said motors are servo motors, each forming part of an electric servo control system forming said actuating means and comprising a servo amplifier for controlling the motor to rotate at a speed and in a sense dependent upon the magnitude and sense of an applied signal, a tachometer signal generator driven by the motor to generate a feed-back signal representing the speed of rotation of the motor, and means for applying to said amplifier both said feed-back signal and a signal representing any departure of the respective one of the first and second quantities from its desired value.

21. An aircraft control cabin according to claim 18 in which there is further provided means for generating a bank error signal representing the difference between a demanded bank attitude and the actual bank attitude of the aircraft and means for applying said bank error signal to control the actuating means for the second visual indicating devices.

22. An aircraft control cabin according to claim 21 in which said bank error signal generating means comprises means for generating a bank demand signal, means for generating an actual bank attitude signal and means for subtracting said two signals to generate said bank error signal, said means for generating a bank demand signal including at least one source of signals which source is operative in flight to generate a signal varying in dependence upon the aircraft's course and position and representing a demand for the bank manoeuvres required for the aircraft to fly on a pre-selected path.

23. An aircraft control cabin according to claim 22 in which there are at least two of said sources of signals and which further includes switching means for bringing a selected one of said sources into operation.

24. An aircraft control cabin according to claim 18 in which there is further provided means for generating a pitch error signal representing the difference between a demanded pitch attitude and the actual pitch attitude of the aircraft and means for applying said pitch error signal to control the actuating means for the first visual indicating devices.

25. An aircraft control cabin according to claim 24 in which said pitch error signal generating means comprises means for generating a pitch demand signal, means for generating an actual pitch attitude signal and means for subtracting said two signals to generate said pitch error signal, said means for generating a pitch demand signal including at least one source of signals which source is operative in flight to generate a signal varying in dependence upon the aircraft's height and pitch attitude and representing a demand for the pitch manoeuvres required for the aircraft to fly on a pre-selected path.

26. An aircraft control cabin as set forth in claim 25, comprising a plurality of said means for generating a pitch error signal and switching means for connecting a selected one of said means into operation.

27. Visual indicating apparatus for use in an aircraft control cabin and adapted to be mounted towards the periphery of an operator's field of view when looking in a general direction out of the aircraft to provide stimulation of the parafoveal region of the operator's eye and to convey information to the operator without directly focussed visual inspection, the apparatus comprising at least two visual indicating devices each of which includes a cylindrical member mounted for rotation about its longitudinal axis and means for radiating light from a continuous helical area of at least two complete turns on the surface of the member, the member being mounted in an enclosure provided with a slot exposing a longitudinal strip of the surface of the member, actuating means for each device which means includes an electric motor coupled to the device to cause rotation of the member about its longitudinal axis in either sense and separate means for energising each motor to drive the member at a velocity and in a sense dependent on the magnitude and sense of an input signal, means for generating and applying to the actuating means for a first one of said devices a signal representing the difference between the aircraft's actual pitch attitude and a demanded pitch attitude, and means for generating and applying to the actuating means for a second one of said devices a signal representing the difference between the aircraft's actual bank attitude and a demanded bank attitude.

28. Visual indicating apparatus according to claim 27, in which the helical area on each device has at least four and not more than ten complete turns.

29. Visual indicating apparatus according to claim 28 in which each cylindrical member has interlaced black and white helices on its surface and the indicating devices further include means mounted within the enclosure for illuminating the surface of the cylindrical member.

References Cited in the file of this patent

UNITED STATES PATENTS

| | | |
|---|---|---|
| 2,053,183 | Crane et al. | Sept. 1, 1936 |
| 2,238,718 | De Florez et al. | Apr. 15, 1941 |
| 2,448,023 | Folland et al. | Aug. 31, 1948 |
| 2,496,274 | De Florez | Feb. 7, 1950 |

OTHER REFERENCES

D. G. Aid et al.: "Displaying Integrated Instrumentation," pp. 68–70, Electronic Industries, July 1958, copy in Div. 65.

John Tunstall: "Pilot Aid Designed for Automatic Landing," pp. 83–84, Aviation Week, July 11, 1960, copy in Div. 36.